(12) United States Patent
Chang et al.

(10) Patent No.: US 8,767,151 B2
(45) Date of Patent: Jul. 1, 2014

(54) IN-PLANE SWITCHING LIQUID CRYSTAL DISPLAY

(75) Inventors: Jun-Won Chang, Daejeon (KR); Belyaev Sergey, Daejeon (KR); Malimonenko Nikolay, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/485,714

(22) Filed: May 31, 2012

(65) Prior Publication Data

US 2012/0293758 A1    Nov. 22, 2012

Related U.S. Application Data

(63) Continuation of application No. 12/451,888, filed as application No. PCT/KR2008/007158 on Dec. 4, 2008, now Pat. No. 8,305,545.

(30) Foreign Application Priority Data

Dec. 4, 2007  (KR) .......................... 10-2007-0125090
Dec. 4, 2008  (KR) .......................... 10-2008-0122194

(51) Int. Cl.
*G02F 1/00* (2006.01)
*G02F 1/13363* (2006.01)

(52) U.S. Cl.
CPC ...... *G02F 1/133632* (2013.01); *G02F 2413/02* (2013.01); *G02F 2413/07* (2013.01); *G02F 2413/11* (2013.01)
USPC .............................. 349/117; 349/181; 349/96

(58) Field of Classification Search
USPC ........................................... 349/117, 181, 96
See application file for complete search history.

(56) References Cited

U.S. PATENT DOCUMENTS

| | | | | |
|---|---|---|---|---|
| 6,028,651 A | * | 2/2000 | Abileah et al. | 349/123 |
| 6,219,122 B1 | * | 4/2001 | Uchida et al. | 349/117 |
| 6,285,430 B1 | * | 9/2001 | Saito | 349/141 |
| 6,437,843 B1 | * | 8/2002 | Van De Witte et al. | 349/117 |
| 6,519,013 B1 | * | 2/2003 | Nagai et al. | 349/33 |
| 6,912,029 B2 | * | 6/2005 | Tanaka | 349/118 |
| 6,937,308 B2 | | 8/2005 | Ishikawa et al. | |
| 7,088,411 B2 | * | 8/2006 | Allen et al. | 349/121 |
| 7,201,955 B2 | * | 4/2007 | Mac Master | 428/212 |
| 7,227,602 B2 | * | 6/2007 | Jeon et al. | 349/119 |
| 7,283,189 B2 | | 10/2007 | Jeon et al. | |
| 7,301,594 B2 | * | 11/2007 | Yu et al. | 349/120 |
| 7,336,330 B2 | * | 2/2008 | Tanaka | 349/118 |
| 7,463,320 B2 | | 12/2008 | Kobayashi et al. | |
| 7,522,238 B2 | * | 4/2009 | Matsuoka | 349/117 |
| 7,532,285 B2 | | 5/2009 | Nagai et al. | |

(Continued)

FOREIGN PATENT DOCUMENTS

| | | |
|---|---|---|
| CN | 1475847 A | 2/2004 |
| CN | 1777834 A | 5/2006 |

(Continued)

*Primary Examiner* — Kaveh Kianni
(74) *Attorney, Agent, or Firm* — McKenna Long & Aldridge LLP (57) ABSTRACT

There is provided an integrated wide viewing film including: a first film having an optical axis located in-plan; and a second film having an optical axis located in a thickness direction thereof, and inclined at a predetermined angle in an in-plane direction. The IPS-LCD employing the integrated wide viewing film can be significantly improved in a contrast ratio in a diagonal direction.

11 Claims, 9 Drawing Sheets

(56) References Cited

U.S. PATENT DOCUMENTS

| | | |
|---|---|---|
| 2004/0017532 A1 | 1/2004 | Ishikawa et al. |
| 2004/0066482 A1* | 4/2004 | Tanaka .......................... 349/141 |
| 2004/0080691 A1 | 4/2004 | Mi et al. |
| 2005/0110933 A1* | 5/2005 | Jeon et al. ..................... 349/141 |
| 2005/0112343 A1* | 5/2005 | MacMaster ................... 428/212 |
| 2005/0129918 A1* | 6/2005 | Mac Master ................... 428/212 |
| 2005/0140900 A1* | 6/2005 | Jeon et al. ..................... 349/141 |
| 2005/0219449 A1* | 10/2005 | Tanaka .......................... 349/119 |
| 2005/0243252 A1* | 11/2005 | Matsuoka ..................... 349/117 |
| 2005/0248707 A1* | 11/2005 | Jeon et al. ..................... 349/141 |
| 2006/0055854 A1* | 3/2006 | Yu et al. ........................ 349/117 |
| 2006/0203158 A1 | 9/2006 | Parri et al. |
| 2006/0285051 A1* | 12/2006 | Jeon et al. ..................... 349/141 |
| 2007/0064187 A1* | 3/2007 | Takeda et al. ................ 349/127 |
| 2007/0285599 A1* | 12/2007 | Oxude ............................ 349/99 |
| 2008/0079878 A1* | 4/2008 | Sugiyama et al. ............. 349/119 |
| 2008/0094326 A1* | 4/2008 | Yamaki et al. ................. 345/87 |
| 2009/0102989 A1* | 4/2009 | Sakai et al. ........................ 349/1 |
| 2009/0103012 A1* | 4/2009 | Itadani et al. ................... 349/96 |
| 2009/0115944 A1* | 5/2009 | Jeon et al. ....................... 349/96 |
| 2009/0147193 A1 | 6/2009 | Uchida et al. |
| 2010/0007822 A1* | 1/2010 | Itadani et al. ................... 349/96 |

FOREIGN PATENT DOCUMENTS

| | | |
|---|---|---|
| JP | 2002-055341 | 2/2002 |
| JP | 2004-94219 | 3/2004 |
| JP | 2006-106338 | 4/2006 |
| JP | 2006-146088 | 6/2006 |
| JP | 2006-178401 | 7/2006 |
| JP | 2006-520008 | 8/2006 |
| JP | 2006-524347 | 10/2006 |
| JP | 2007-148099 | 6/2007 |
| KR | 10-2005-0074972 A | 7/2005 |
| KR | 10-2005-0101743 A | 10/2005 |
| KR | 10-2006-0051145 A | 5/2006 |
| KR | 10-2007-0003388 A | 1/2007 |
| KR | 10-2007-0024785 A | 3/2007 |
| WO | WO 2005/038517 A1 | 4/2005 |
| WO | WO 2005/065057 A2 | 7/2005 |

* cited by examiner

IN-PLANE SWITCHING LIQUID CRYSTAL DISPLAY

This application is a Continuation of prior application Ser. No. 12/451,888, filed Dec. 4, 2009, now U.S. Pat. No. 8,305,545 which claims the benefit of International Application No. PCT/KR/2008/007158, filed on Dec. 4, 2008, along with Korean Patent Application Nos. 10-2007-0125090, filed on Dec. 4, 2007, and 10-2008-0122194, filed on Dec. 4, 2008, which are hereby incorporated by reference in their entirety as if fully set forth herein.

TECHNICAL FIELD

The present invention relates to an integrated wide viewing film, and more particularly, to an integrated wide viewing film employed in an in-plane switching liquid crystal display (IPS-LCD) and capable of improving a contrast ratio in a diagonal direction.

BACKGROUND ART

An in-plane switching liquid crystal display (IPS-LCD) has liquid crystals initially oriented parallel to a glass substrate and at a predetermined angle with respect to an electrode, and a magnetic field oriented parallel to the glass substrate. The IPS-LCD exhibits a smaller difference in refractivity of a liquid crystal according to a viewing angle and a wider angel of view than a TN-mode where a liquid crystal is oriented vertically.

The IPS-LCD breaks down into in-plane switching (IPS), super in-plane switching (Super IPS), and fringe field switching (FFS) according to a mode of an active matrix driving electrode including a pair of electrodes. However, IPS-LCD of the present invention is construed to encompass all of them.

As described above, the IPS-LCD has a liquid crystal oriented in a parallel direction and thus shows little change in refractivity according to a viewing angle. But the IPS-LCD, when viewed from the side, has the liquid crystal arranged asymmetrically, thereby undergoing color-shift in the left and right sides. Also, the IPS-LCD experiences high light leakage at an inclined angle, thus showing a low contrast ratio at the inclined angle.

Korean Patent Publication No. 2005-0073221 discloses an IPS-LCD device in which a wide viewing film including a negative biaxial film and a +C plate is disposed between a liquid crystal cell and a polarized plate to improve contrast characteristics in the front and at an inclined angle and minimize color-shift. However, this related art still exhibits a low contrast ratio in a diagonal direction.

DISCLOSURE OF INVENTION

Technical Problem

The present invention has been made to solve the foregoing problems of the prior art and therefore an aspect of the present invention is to provide an integrated wide viewing film which improves contrast characteristics in the front and at sides including a diagonal direction for an in-plane switching liquid crystal display filled with a liquid crystal having a positive dielectric anisotropy, and an IPS-LCD using the same.

Technical Solution

In order to achieve the objective, inventors of the present invention have conducted repeated studies and discovered that an IPS-LCD can be improved in contrast characteristics in a diagonal direction by utilizing an integrated wide viewing film having a uniaxial liquid crystal +C film stacked on a negative biaxial retardation film or a uniaxial retardation film with an in-plane retardation which are used to enhance a front contrast ratio. Here, the uniaxial liquid crystal +C film has an optical axis in a thickness direction and inclined at a predetermined angle in an in-plane direction. Based on these findings, the inventors completed the present invention.

According to an aspect of the invention, the invention provides an integrated wide viewing film including: a first film having an optical axis located in-plan; and a second film having an optical axis located in a thickness direction thereof, and inclined at a predetermined angle in an in-plane direction.

The second film may have the optical axis inclined at an angle of −5° to +5° particularly, −3° to +3° with respect to a vertical direction.

The first film may be an +A-film satisfying $n_x > n_y = n_z$ and the second film may be a +C-film satisfying $n_x = n_y < n_z$. The +A-film may have an in-plane retardation of 50 nm to 150 nm at a wavelength of 550 nm, and the +C-film may have a thickness retardation of 50 nm to 250 nm at a wavelength of 550 nm.

The +A film may be disposed such that the optical axis of the +A film is perpendicular to an absorption axis of a polarized plate adjacent to the +A film. The +A film may have the optical axis disposed parallel to an absorption axis of a polarized plate adjacent to the +A film.

The first film is a −B-film satisfying $n_x > n_y > n_z$ and the second film is a +C-film satisfying $n_x = n_y < n_z$. The −B film may have an in-plane retardation of 50 to 150 nm and a thickness retardation of −50 to −200 nm at a wavelength of 550 nm, and the +C-film may have a thickness retardation of 50 nm to 250 nm at a wavelength of 550 nm.

The first film may be a stretched polymer film and the second film may be a liquid crystal film.

According to an aspect of the invention, the invention provides an in-plane switching liquid crystal display (IPS-LCD) including: a liquid crystal panel including an upper substrate, a lower substrate and a liquid crystal cell filled with a liquid crystal having a positive dielectric anisotropy; and first and second polarized plates disposed on both sides of the liquid crystal panel, respectively, wherein the liquid crystal in the liquid crystal cell has an optical axis located in-plane parallel to the polarized plates, the first and second polarized plates have absorption axes perpendicular to each other, wherein the IPS-LCD includes an integrated wide viewing film formed between the liquid crystal panel and the second polarized plate, wherein the integrated wide viewing film comprises a first film having an optical axis located in-plan; and a second film having an optical axis located in a thickness direction thereof, and inclined at a predetermined angle in an in-plane direction.

The liquid crystal cell may have a retardation of 300 nm to 400 nm at a wavelength of 550 nm.

Each of the first and second polarized plates may use an isotropic film as a protective film.

The isotropic film may be a cyclo-olefin polymer (COP) film or a zero TAC film having no retardation.

The second film may have an optical axis inclined at an angle of −5° to +5° with respect to a vertical direction, particularly at an angle of −3° to +3°.

The liquid crystal cell may have a splay orientation of liquid crystal, the first film is a +A film satisfying $n_x > n_y = n_z$, the second film is a +C film satisfying $n_x = n_y < n_z$, and the first film has an optical axis perpendicular to an absorption axis of the second polarized plate.

The liquid crystal cell may have a homogeneous orientation of liquid crystal, the first film is a +A film satisfying $n_x>n_y=n_z$, the second film is a +C film satisfying $n_x=n_y<n_z$, and the first film is disposed parallel to an absorption axis of the second polarized plate.

The liquid crystal cell may have splay orientation of liquid crystal, the first film may be a −B-film satisfying $n_x>n_y>n_z$, and the second film may be a +C-film satisfying $n_x=n_y<n_z$.

Advantageous Effects

An in-plane switching liquid crystal display (IPS-LCD) of the present invention employs an integrated wide viewing film including a film having an optical axis in a thickness direction and inclined at a predetermined angle to ensure a wide angle of view regardless of orientation of a liquid crystal within a liquid crystal cell.

Also, the IPS-LCD employing the integrated wide viewing film of the present invention is improved in a contrast ratio in a diagonal direction and free from color-shift.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

The present invention now will be described more fully hereinafter with reference to the accompanying drawings.

First, a description will be given of a basic structure of a general in-plane switching liquid crystal display (IPS-LCD), an arrangement of an optical axis and a relationship between a retardation film and refractivity.

Figure 1:
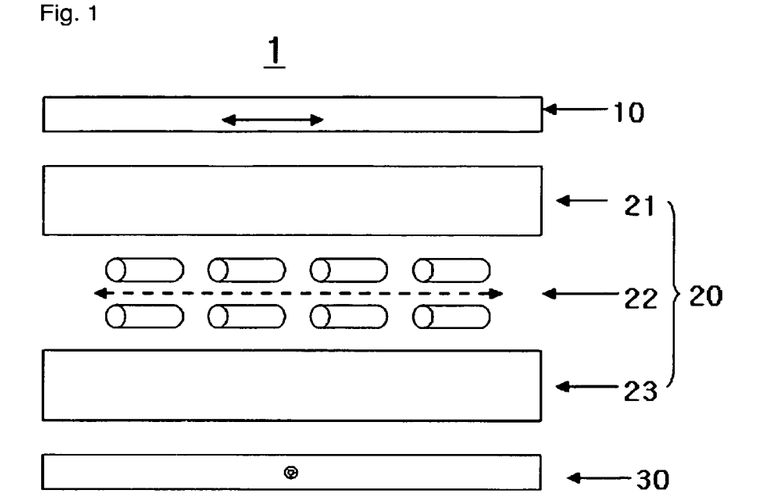
FIG. 1 illustrates a basic structure of an in-plane switching liquid crystal display (IPS-LCD)

FIG. 1 illustrates a basic structure of an IPS-LCD. As shown in FIG. 1, the IPS-LCD includes a first polarized plate 10, a second polarized plate 30 and a liquid crystal panel 20. The liquid crystal panel 20 includes liquid crystal cells 22 filled with liquid crystals having a positive dielectric anisotropy oriented in a parallel direction between two substrates 21 and 23.

Moreover, as shown in FIG. 1, an absorption axis of the first polarized plate 10 (indicated with ⇔) and an absorption axis of the second polarized plate 30 (indicated with ⊙) are perpendicular to each other. Also, the absorption axis (indicated with ⇔) of the first polarized plate 10 and an optical axis (indicated with <-->) of the liquid crystal cells 22 are parallel to each other. Generally, a backlight is located adjacent to the first polarized plate 10 to which the optical axis of the liquid crystal cell 22 is disposed parallel.

Meanwhile, the first polarized plate 10 and the second polarized plate 30 each include a polarized film (not shown) and a protective film (not shown) attached to at least one of two surfaces of the polarized film (not shown). The polarized film is a very thin stretched film and easily damaged by mechanical and physical external pressure. This is why the protective film is attached to the polarized film. This protective film generally employs a triacetate cellulose (TAC) film, a polynobonene (PNB) film, a cyclo-olefin (COP) film and etc.

Figure 2:
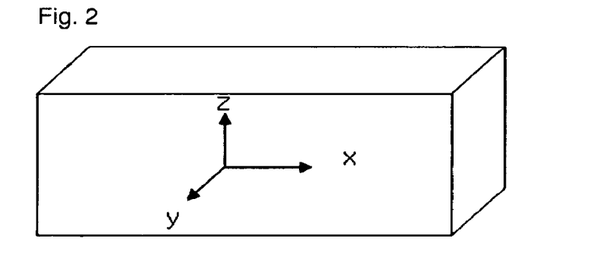
FIG. 2 illustrates a refractivity of a retardation film used to compensate for an angle of view.

FIG. 2 illustrates refractivity of a retardation film used to compensate for an angle of view. For convenience, refractivity in an x axis direction of the retardation film is denoted with $n_x$, refractivity in a y axis direction is denoted with $n_y$, and refractivity in a z axis direction is denoted with $n_z$. The retardation film has characteristics determined according to magnitude of the refractivities. Here, in a case where two of three-axis directions have different refractivities, the retardation film is referred to as a uniaxial retardation film. Also, in a case where all of three-axis directions have different refractivities, the retardation film is referred to as a biaxial retardation film.

The uniaxial film includes an A film satisfying $n_x \neq n_y=n_z$ and a C film satisfying $n_x=n_y \neq n_z$. Here, the uniaxial film satisfying $n_x>n_y=n_z$ is referred to as a +A film. Also, the uniaxial film satisfying $n_x=n_y<n_z$ is referred to as a −A film. Moreover, the uniaxial film satisfying $n_x=n_y>n_z$ is referred to as a +C film and the uniaxial film satisfying $n_x=n_y>n_z$ is referred to as a −C film.

Meanwhile, the biaxial film is represented by a B film. Particularly, the biaxial film satisfying $n_x>n_y>n_z$ is referred to as a −B film.

In order to represent characteristics of the retardation film, generally, in-plane retardation $R_{in}$ and thickness retardation $R_{th}$ are employed. The in-plane retardation and the thickness retardation are defined according to following Equations 1 and 2, respectively:

$$\text{In-plane retardation } R_{in}=(n_x-R_y) \times d \qquad \text{Equation 1,}$$

where d is the thickness of a film, $$\text{Thickness retardation } R_{th}=(n_x-n_y) \times d \qquad \text{Equation 2,}$$

where d is the thickness of a film.

Hereinafter, an integrated wide viewing film will be described with reference to the drawings.

Figure 3:
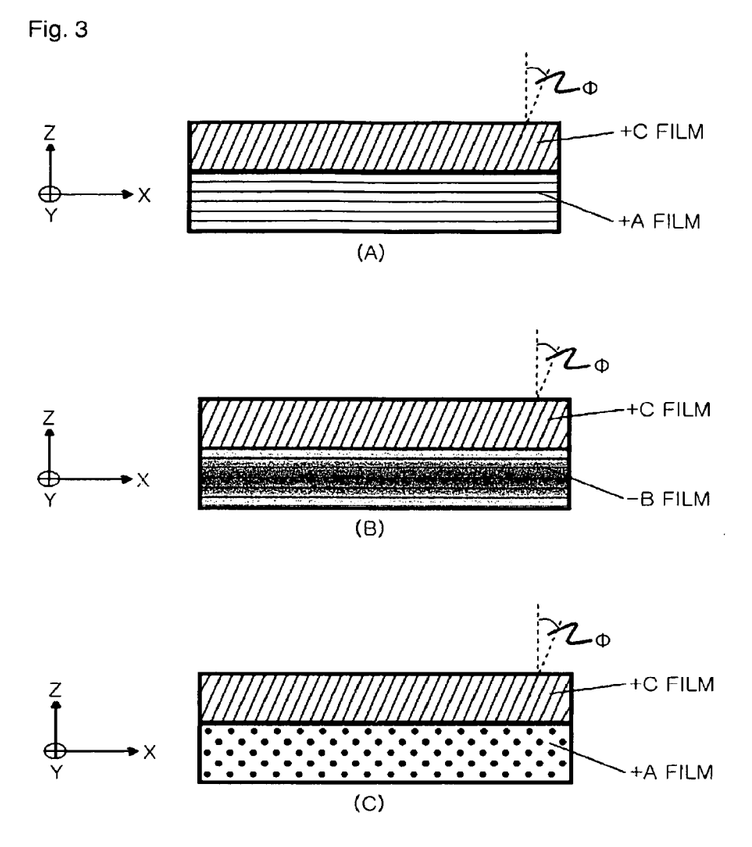
FIGS. 3A to 3C illustrate an integrated wide viewing film according to exemplary embodiments of the invention.

FIGS. 3A to 3C illustrate an integrated wide viewing film according to various embodiments of the invention. As shown in FIGS. 3A to 3C, the integrated wide viewing film of the present invention includes a first film having an optical axis located in-plane and a second film having an optical axis located in a thickness direction and inclined at a predetermined angle in an in-plane direction.

More specifically, as shown in FIGS. 3A and 3C, the integrated wide viewing film may utilize a +A film and a +C film. As shown in FIG. 3B, the intergraded wide viewing film may adopt a −B film and a +C film. Here, the +A film and the −B film have optical axes located in-plane and the +C film has an optical axis located in a thickness direction and inclined at a predetermined angle in an in-plane direction.

Figure 4:
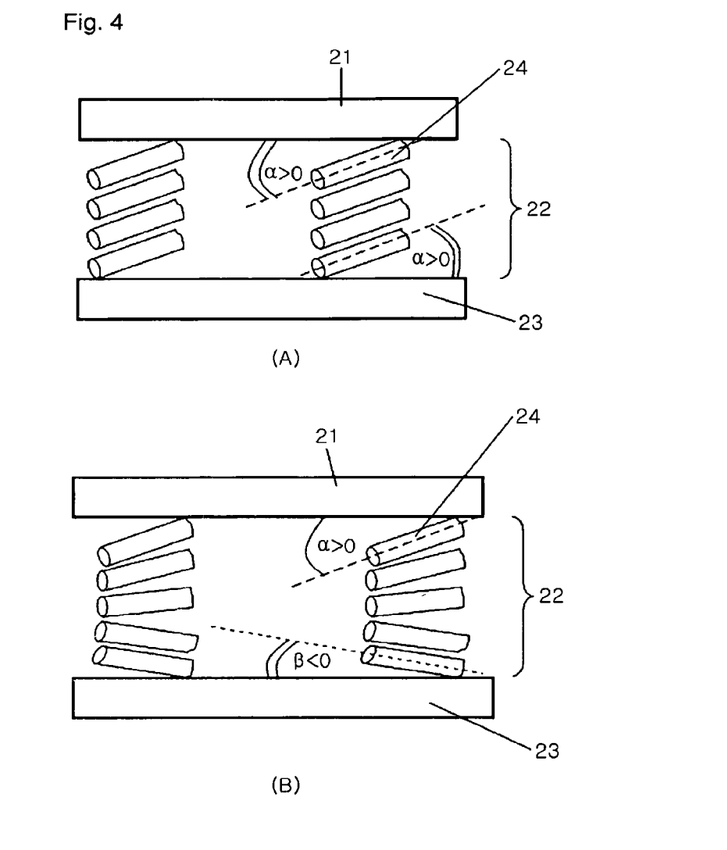
FIGS. 4A and 4B illustrate orientation of liquid crystals of an IPS-LCD.

In the present invention, a configuration in which the +C film has the optical axis inclined at a predetermined angle in an in-plane direction is related to orientation of liquid crystals in a liquid crystal cell of an IPS-LCD. As described above, the IPS-LCD is characterized such that the liquid crystals are oriented in a parallel direction within the liquid crystal cell. However, it is substantially impossible to orient the liquid crystals to be exactly horizontal to one another inside the IPS-LCD. Most IPS-LCDs have a pretilt angle of 5 or less. FIG. 4 illustrates the orientation of liquid crystals in the IPS-LCD. According to a rubbing direction of a glass substrate, the liquid crystal cell of the IPS-LCD may be configured to be in a homogeneous orientation as shown in FIG. 4A or in a splay orientation as shown in FIG. 4B. Whichever type the liquid crystal cell is formed of, the liquid crystals are not oriented in an entirely parallel direction. As described above, the liquid crystals are not oriented in an entirely parallel direction but have a pretilt angle. This causes retardation asymmetry in which retardation is varied when light passes through the liquid crystals from the side.

Based on this, according to this invention, the optical axis of +C film having a thickness retardation is designed to be inclined at a predetermined angle and thus the retardation asymmetry due to a pretilt of the liquid crystals in the liquid crystal cell can be optically compensated.

Here, the +C film has the optical axis inclined at an angle of −5° to +5° with respect to a vertical direction, particularly, at an angle of −3° to +3°. The angle of the optical axis of the +C film may be varied according to the pretilt angle of a liquid crystal cell of the IPS-LCD, but the angle of the optical axis exceeding ±5° leads to additional asymmetrical retardation resulting from the film, thereby degrading performance. Meanwhile, the angle of the optical axis falling within ±3° ensures a superior contrast ratio.

Meanwhile, in the present embodiment, the first film, i.e., the +A film or the −B film may be formed of a stretched polymer film. For example, the +A film may be a uniaxially stretched TAC film, a uniaxially stretched acryl film or a uniaxially stretched COP film. The −B film may be a biaxially stretched TAC film, a biaxially stretched acryl film or a biaxially stretched COP film.

Also, the second film, i.e, the +C film having the optical axis disposed in a thickness direction and inclined at a predetermined angle may be made of a cured liquid crystal. That is, in order to fabricate the integrated wide viewing film according to the present invention, an orientation film is applied on the first film formed of a polymer film and the liquid crystals are oriented to have a desired pretilt angle and coated to form the second film.

In the present embodiment, it is preferred that the +A film has an in-plane retardation of 50 nm to 150 nm at a wavelength of 550 nm and the +C film has a thickness retardation of 50 nm to 250 nm at a wavelength of 550 nm. It is preferred that the −B film has an in-plane retardation of 50 to 150 nm and a thickness retardation of −50 to −200 nm at a wavelength of 550 nm.

Also, there is provided an IPS-LCD employing an integrated wide viewing film according to the present invention.

The IPS-LCD of the present invention includes: a liquid crystal panel including an upper substrate, a lower substrate and a liquid crystal cell filled with a liquid crystal having a positive dielectric anisotropy. Also, the IPS-LCD includes first and second polarized plates disposed on both sides of the liquid crystal panel, respectively. The liquid crystal in the liquid crystal cell has an optical axis located in-plane parallel to the polarized plates, respectively. The first and second polarized plates have absorption axes perpendicular to each other. Here, the IPS-LCD includes an integrated wide viewing-film formed between the liquid crystal panel and the second polarized plate. The integrated wide viewing film comprises a first film and a second film. The first film has an optical axis located in-plan. The second film has an optical axis located in a thickness direction thereof, and inclined at a predetermined angle in an in-plane direction.

Figure 5:
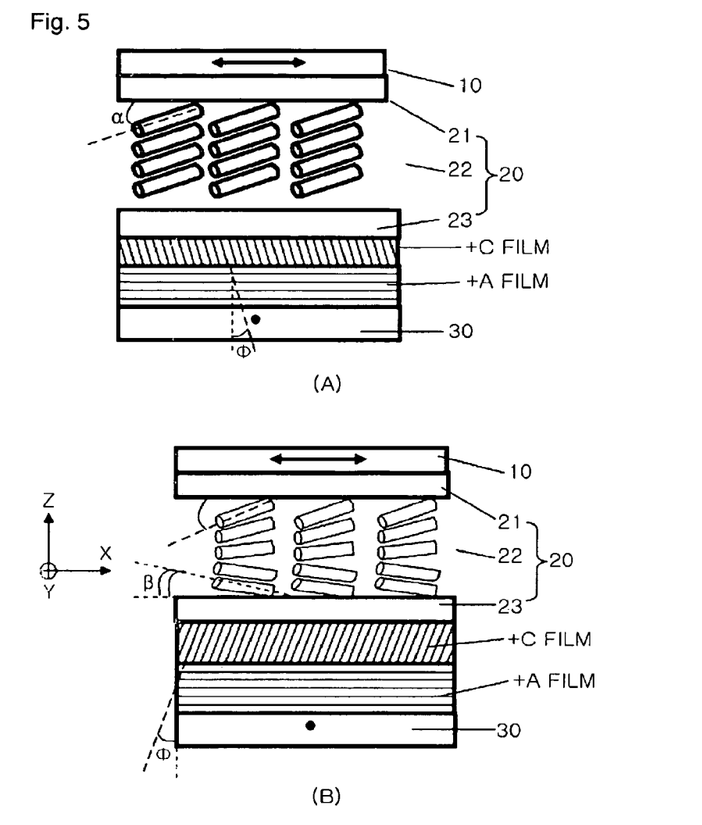
FIGS. 5A and 5B illustrate an IPS-LCD according to an exemplary embodiment of the invention, respectively.
Figure 6:
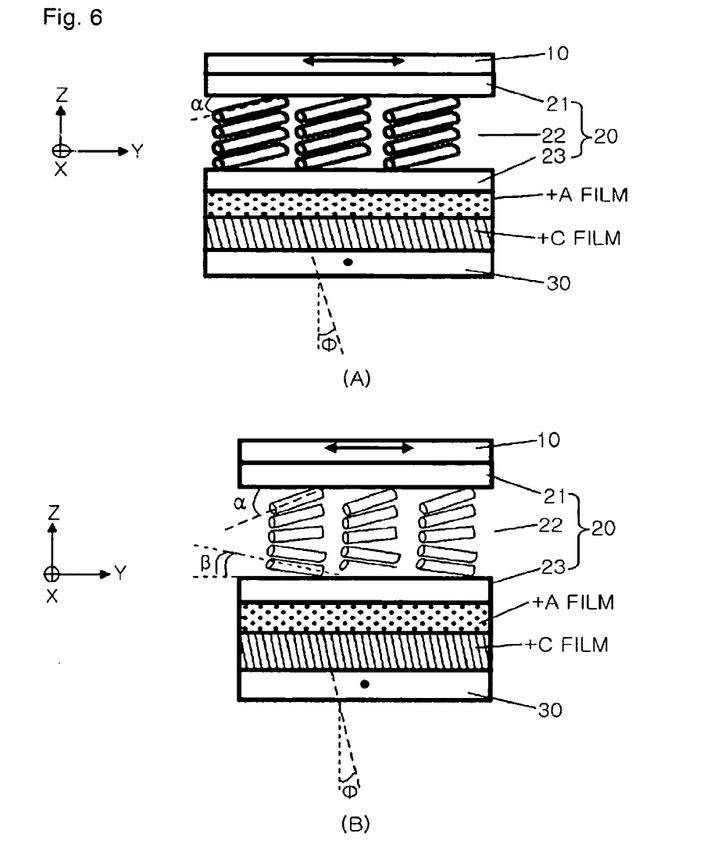
FIGS. 6A and 6B illustrate an IPS-LCD according to another exemplary embodiment of the invention, respectively.
Figure 7:
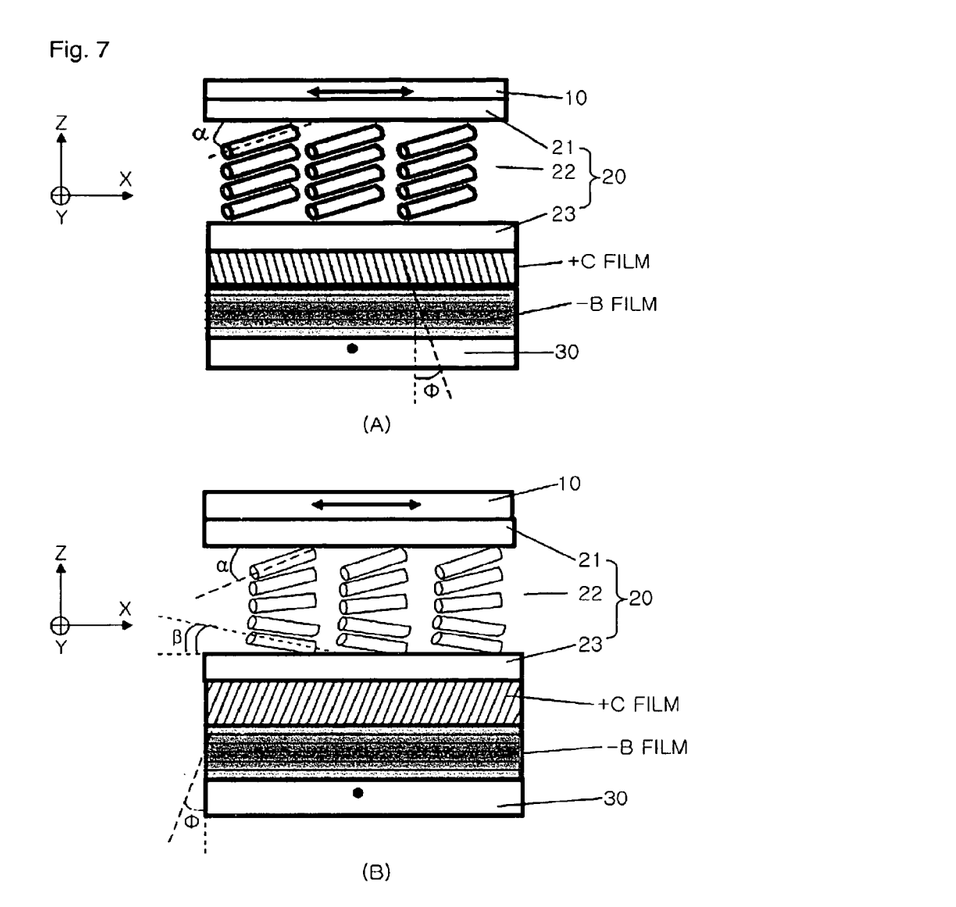
FIGS. 7A and 7B illustrate an IPS-LCD according to still another exemplary embodiment of the invention, respectively.

FIGS. 5 to 7 illustrate an IPS-LCD according to exemplary embodiments of the invention. Hereinafter, the present embodiments will be described with reference to drawings.

First, referring to FIGS. 5A and 5B, the IPS-LCD includes a first polarized plate 10, a liquid crystal panel 20, and a second polarized panel 30. The liquid crystal panel 20 includes an upper substrate 21 and a lower substrate 23 provided at a predetermined distance and liquid crystal cells 22 interposed between the upper and lower substrates 21 and 23 and filled with liquid crystals having a positive dielectric anisotropy. Here, the first polarized plate 10 has an absorption axis perpendicular to an absorption axis of the second polarized plate 30. Also, the IPS-LCD includes an integrated wide viewing film disposed between the liquid crystal panel 20 and the second polarized plate 30 and having a +A film and a +C film stacked sequentially on the second polarized plate 30.

The liquid crystal cells 22 of the liquid crystal panel may be in a homogeneous orientation as shown in FIG. 5A and in a splay orientation as shown in FIG. 5B. Moreover, the liquid crystal cells 22 have a retardation of 300 nm to 400 nm at a wavelength of 550 nm.

Meanwhile, the integrated wide viewing film is configured such that the +A film and the +C film are sequentially stacked on the second polarized plate. Here, the +C film has an optical axis located in a thickness direction and inclined at an angle of +5° to −5° particularly, −3° to +3° with respect to a direction perpendicular to a surface of the polarized plate. Moreover, the +A film has an optical axis located perpendicular to the absorption axis (indicated with ●) of the second polarized plate.

The +A-film has an in-plane retardation of 50 nm to 150 nm at a wavelength of 550 nm and the +C-film has a thickness retardation of 50 nm to 250 nm at a wavelength of 550 nm.

FIGS. 6A and 6B illustrate an IPS-LCD according to another exemplary embodiment of the invention, respectively.

As shown in FIGS. 6A and 6B, the IPS-LCD apparatus of the present invention includes a first polarized plate 10, a liquid crystal panel 20, and a second polarized plate 30. The liquid crystal panel 20 includes two substrates 21 and 23 disposed at a predetermined distance and liquid crystal cells 22 interposed between the upper and lower substrates 21 and 23 and filled with liquid crystals having a positive dielectric anisotropy. Here, the first polarized plate 10 has an absorption axis perpendicular to an absorption axis of the second polarized plate 30. Also, the IPS-LCD includes an integrated wide viewing film interposed between the liquid crystal panel 20 and the second polarized plate 30 and comprising a +C film and a +A film sequentially stacked from the second polarized plate.

Here, the +A film has an optical axis disposed parallel to an absorption axis (indicated with ●) of the second polarized plate 30. Also, the +C film has an optical axis located in a thickness direction and inclined at an angle of ±5°, particularly, ±3° in a direction perpendicular to a surface of the polarized plate.

Meanwhile, the liquid crystal cells 22 of the liquid crystal panel may in a homogeneous orientation as shown in FIG. 6A and in a splay orientation as shown in FIG. 6B. Moreover, the liquid crystal cells 22 have a retardation of 300 nm to 400 nm at a wavelength of 550 nm.

The +A-film has an in-plane retardation of 50 nm to 150 nm at a wavelength of 550 nm. The +C-film has a thickness retardation of 50 nm to 250 nm at a wavelength of 550 nm.

FIGS. 7A and 7B illustrate an IPS-LCD according to still another exemplary embodiment of the invention, respectively.

As shown in FIGS. 7A and 7B, the IPS-LCD of the present invention includes a first polarized plate 10, a liquid crystal panel 20, and a second polarized plate 30. The liquid crystal panel 20 includes upper and lower substrates 21 and 23 disposed at a predetermined distance and liquid crystal cells 22 interposed between the upper and lower substrates and filled with liquid crystals having a positive dielectric anisotropy. The first polarized plate 10 has an absorption axis perpendicular to an absorption axis of the second polarized plate 30. Also, the IPS-LCD includes an integrated wide viewing film interposed between the liquid crystal panel 20 and the second polarized plate 30 and comprising a −B film and a +C film sequentially stacked from the second polarized plate.

Here, the liquid crystal cells 22 of the liquid crystal panel may be in a homogeneous orientation as shown in FIG. 7A and in a splay orientation as shown in FIG. 7B. Also, the liquid crystal cells 22 have a retardation of 300 nm to 400 nm at a wavelength of 550 nm.

Meanwhile, the −B film has an optical axis disposed perpendicular to an absorption axis (indicated with ●) of the second polarized plate. The +C film has an optical axis located in a thickness direction and inclined at an angle of ±5°, particularly, ±3° in a vertical direction.

Moreover, the −B-film may have an in-plane retardation of 50 to 150 nm and a thickness retardation of 50 to 200 nm at a wavelength of 550 nm. The +C-film may have a thickness retardation of 50 nm to 250 nm at a wavelength of 550 nm.

Compensation of a viewing angle of the IPS-LCD is also affected by a protective film used to protect the polarized film. For example, in a case where the protective film employs a film having a thickness radiation, the IPS-LCD is less capable of compensating for viewing angle. Therefore, in the present invention, the protective film for use in the first polarized plate and the second polarized plate adopts an isotropic film such as an unstretched COP, TAC with no retardation and an unstretched acryl film to ensure superb compensation of the viewing angle.

The protective film may be disposed on at least one surface, particularly, both surfaces of the polarized film. However, as for the second polarized plate, a protective film formed of the isotropic film is provided on only one surface of the polarized film. That is, an additional protective film is not provided on a surface of the polarized film where the integrated wide viewing film is stacked but the integrated wide viewing film is directly stacked on the polarized film to serve as a protective film.

MODE FOR THE INVENTION

Exemplary embodiments of the present invention will now be described in detail with reference to the accompanying drawings.

Inventive Example 1

An ISP-LCD structured as shown in FIG. 5B was simulated for a minimum contrast ratio at an azimuth angle of 45° and all inclined angles.

Simulation conditions were as follows.

(1) Liquid crystal cells: cell spacing 3.3 μm, each pretilt angle 1.4°, dielectric anisotropy Δ∈=+7, birefringence at a wavelength of 550 nm Δn=0.1., splay orientation (2) First polarized plate and second polarized plate: protective film thickness=80 μm, no thickness retardation (3) +A film: film thickness=80 μm, $R_{in}$=150 nm (4) +C film: film thickness=1 μm, $R_{th}$=100 nm, optical axis angle+3°

Figure 8:
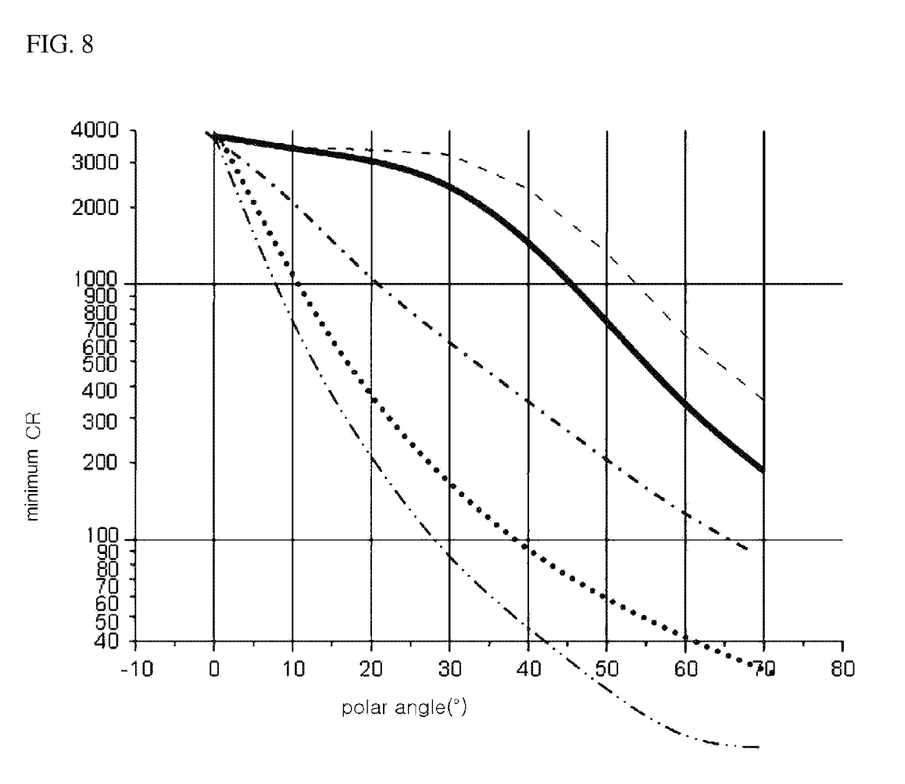
FIG. 8 is a simulation result of Inventive Example 1 of the present invention.

A simulation result is plotted with a solid line in a graph of FIG. 8.

Comparative Example 1

Simulation was conducted under the same condition as Inventive Example 1 except that Comparative Example 1 employed a +C film having an optical axis inclined at +20° with respect to a vertical direction.

A simulation result is plotted with line ...... in a graph of FIG. 8.

Comparative Example 2

Simulation was conducted under the same condition as Inventive Example 1 except that Comparative Example 2 employed a +C film having an optical axis inclined at +25° with respect to a vertical direction.

A simulation result is plotted with line -••-••- in a graph of FIG. 8.

Comparative Example 3

For comparison, simulation was conducted on an IPS-LCD which did not employ an integrated wide viewing film.

<Simulation Conditions>

(1) Liquid crystal cells: cell spacing 3.3 μm, each pretilt angle 1.4°, dielectric anisotropy Δ∈=+7, birefringence at a wavelength of 550 nm Δn=0.1., splay orientation (2) First polarized plate and second polarized plate: protective film thickness=80 μm, no thickness retardation A simulation result is plotted with line -•-•- in a graph of FIG. 8.

Comparative Example 4

For comparison, simulation was conducted on an ideal IPS-LCD where liquid crystals in a liquid crystal cell do not have a pretilt angle and are oriented in an entirely parallel direction in order to measure a minimum contrast ratio at an azimuth angle of 45° and all inclined angles.

<Simulation Conditions>

(1) Liquid crystal cells: cell spacing 3.3 μm, each pretilt angle 0°, dielectric anisotropy Δ∈=+7, birefringence at a wavelength of 550 nm Δn=0.1., splay orientation (2) First polarized plate and second polarized plate: protective film thickness=80 μm, no thickness retardation A simulation result is plotted with line ----- in a graph of FIG. 8.

Inventive Example 2

An ISP-LCD structured as shown in FIG. 6A was simulated for a minimum contrast ratio at an azimuth angle of 45° and all inclined angles.

<Simulation Conditions>

(1) liquid crystal cells: cell spacing 3.3 μm, each pretilt angle 1.4°, dielectric anisotropy Δ∈=+7, birefringence at a wavelength of 550 nm Δn=0.1., homogeneous orientation (2) First polarized plate: protective film thickness=80 μm, no thickness retardation (3) Second polarized plate: a TAC film having protective film thickness=50 μm, and Rth=−30 nm (3) +A film: film thickness=80 μm, $R_{in}$=130 nm (4) +C film: film thickness=1 μm, $R_{th}$=100 nm, optical axis angle 3°

Figure 9:
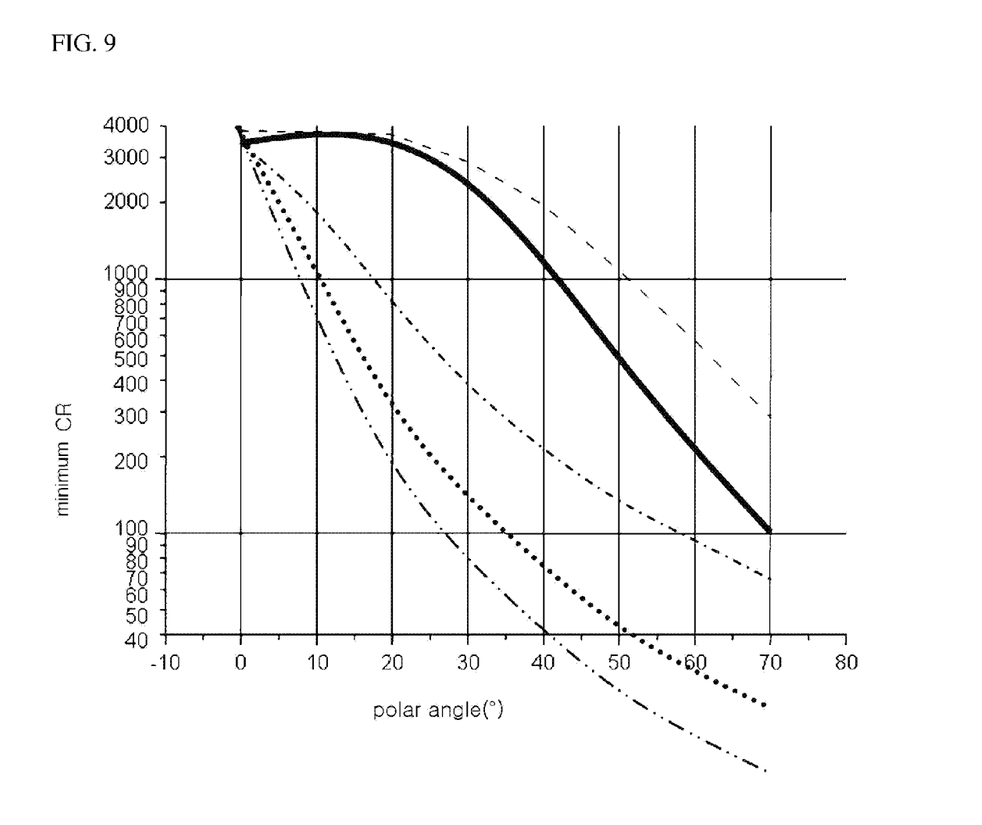
FIG. 9 is a simulation result of Inventive Example 2 of the present invention.

A simulation result is plotted with a solid line in a graph of FIG. 9.

Comparative Example 5

Simulation was conducted under the same condition as Inventive Example 2 except that Comparative Example 5 employed a +C film having an optical axis inclined at +20° with respect to a vertical direction.

A simulation result is plotted with line in a graph of FIG. 9.

Comparative Example 6

Simulation was conducted under the same condition as Inventive Example 2 except that Comparative Example 6 employed a +C film having an optical axis inclined at +25° with respect to a vertical direction.

A simulation result is plotted with line -••-••- in a graph of FIG. 9.

Comparative Example 7

For comparison, simulation was conducted on an IPS-LCD which did not employ an integrated wide viewing film.

A simulation result is plotted with line -•-•- in a graph of FIG. 9.

<Simulation Conditions>

(1) Liquid crystal cells: cell spacing 3.3 μm, each pretilt angle 1.4°, dielectric anisotropy Δ∈=+7, birefringence at a wavelength of 550 nm Δn=0.1., homogeneous orientation (2) First polarized plate: protective film thickness=80 μm, no thickness retardation (3) Second polarized plate: a TAC film having protective film thickness=50 μm, and Rth=−30 nm Comparative Example 8

For comparison, simulation was conducted on an ideal IPS-LCD where liquid crystals in a liquid crystal cell do not have a pretilt angle and are oriented in a totally parallel direction in order to measure a minimum contrast ratio at an azimuth angle of 45° and all inclined angles.

A simulation result is plotted with line ---- in a graph of FIG. 9.

<Simulation Conditions>

(1) Liquid crystal cells: cell spacing 3.3 μm, each pretilt angle 0°, dielectric anisotropy Δ∈=+7, birefringence at a wavelength of 550 nm Δn=0.1., homogeneous orientation (2) First polarized plate: protective film thickness=80 μm, no thickness retardation (3) Second polarized plate: a TAC film having protective film thickness=50 μm, and Rth=−30 nm Inventive Example 3

An ISP-LCD as shown in FIG. 7B was simulated for a minimum contrast ratio at an azimuth angle of 45° and all inclined angles.

<Simulation Conditions>

(1) Liquid crystal cells: cell spacing 3.3 μm, each pretilt angle 1.4°, dielectric anisotropy Δ∈=+7, birefringence at a wavelength of 550 nm Δn=0.1., splay orientation (2) First polarized plate and second polarized plate: protective film thickness=80 um, no thickness retardation (3) −B film: thickness=80 μm, $R_{in}$=90 nm, $R_{th}$=−70 nm (4) +C film: thickness=1 μm $R_{th}$=100 nm, optical axis angle 3°

Figure 10:
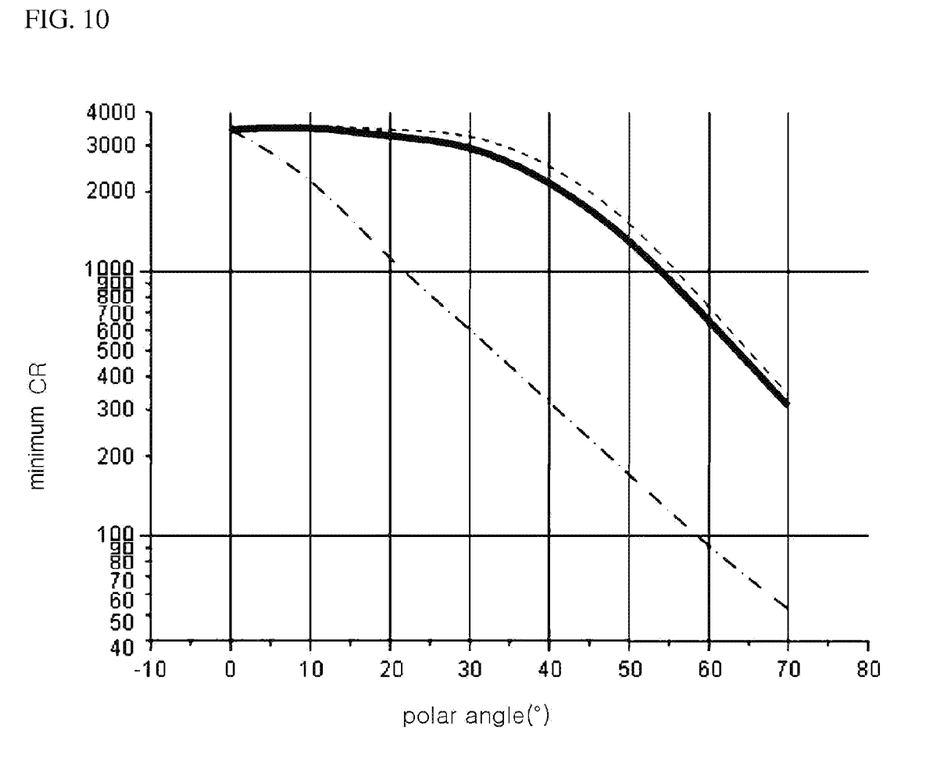
FIG. 10 is a simulation result of Inventive Example 3 of the present invention.

A simulation result is plotted with a solid line in a graph of FIG. 10.

Comparative Example 9

For comparison, simulation was conducted on an IPS-LCD which did not employ an integrated wide viewing film.

A simulation result is plotted with line -•-•- in a graph of FIG. 10.

<Simulation Conditions>

(1) Liquid crystal cells: cell sparing 3.3 μm, each pretilt angle 1.4°, dielectric anisotropy Δ∈=+7, birefringence at a wavelength of 550 nm Δn=0.1., splay orientation (2) First polarized plate and second polarized plate: protective film thickness=80 μm, no thickness retardation.

Comparative Example 10

For comparison, simulation was conducted on an ideal IPS-LCD where liquid crystals in a liquid crystal cell do not have a pretilt angle and are oriented in a totally parallel direction in order to measure a minimum contrast ratio at an azimuth angle of 45° and all inclined angles.

A simulation result is plotted with line ----- in a graph of FIG. 10.

<Simulation Conditions>

(1) Liquid crystal cells: cell spacing 3.3 μm, each pretilt angle 0°, dielectric anisotropy Δ∈=+7, birefringence at a wavelength of 550 nm Δn=0.1., splay orientation (2) First polarized plate and second polarized plate: protective film thickness=80 μm, no thickness retardation.

FIGS. 8 to 10 show that the IPS-LCD employing the integrated wide viewing film of the present invention exhibits a behavior that is close to the most ideal IPS-LCD. Moreover, FIGS. 8 and 9 show that with a greater inclined angle of the optical axis of the +C film, the IPS-LCD is degraded in performance.

While the present invention has been shown and described in connection with the preferred embodiments, it will be apparent to those skilled in the art that modifications and variations can be made without departing from the spirit and scope of the invention as defined by the appended claims.

The invention claimed is:

1. An in-plane switching liquid crystal display comprising:
a liquid crystal panel including an upper substrate, a lower substrate and a liquid crystal cell filled with a liquid crystal having a positive dielectric anisotropy;
first and second polarized plates disposed on both sides of the liquid crystal panel, respectively; and
an integrated wide viewing film including:
a +A-film satisfying $n_x > n_y = n_z$ and having an optical axis located in-plan; and
a +C-film satisfying $n_x = n_y < n_z$ and having an optical axis located in a thickness direction thereof,
wherein the optical axis of the +C-film is, for the purpose of optimization, inclined at an angle not less than −5° and not to exceed +5°, with respect to a vertical direction in an in-plane direction, wherein the liquid crystal in the liquid crystal cell has an optical axis located in-plane parallel to the polarized plates, respectively, and wherein the first and second polarized plates have absorption axes perpendicular to each other.

2. The in-plane switching liquid crystal display of claim 1, wherein the +A-film has an in-plane retardation of 50 nm to 150 nm at a wavelength of 550 nm, and the +C-film has a thickness retardation of 50 nm to 250 nm at a wavelength of 550 nm.

3. The in-plane switching liquid crystal display of claim 1, wherein the +A film has the optical axis disposed perpendicular to an absorption axis of the second polarized plate.

4. The in-plane switching liquid crystal display of claim 3, wherein the liquid crystal cell has a splay orientation of liquid crystal.

5. The in-plane switching liquid crystal display of claim 1, wherein the +A film has the optical axis disposed parallel to an absorption axis of the second polarized plate.

6. The in-plane switching liquid crystal display of claim 5, wherein the liquid crystal cell has a homogeneous orientation of liquid crystal.

7. The in-plane switching liquid crystal display of claim 1, wherein the +A-film is a polymer film and the +C-film is a liquid crystal film.

8. The in-plane switching liquid crystal display of claim 1, wherein the liquid crystal cell has a retardation of 300 nm to 400 nm at a wavelength of 550 nm.

9. The in-plane switching liquid crystal display of claim 1, wherein each of the first and second polarized plates use an isotropic film as a protective film.

10. The in-plane switching liquid crystal display of claim 9, wherein the isotropic film is a cyclo-olefin polymer (COP) or a Zero TAC film having no retardation.

11. The in-plane switching liquid crystal display of claim 1, wherein the integrated wide viewing film is directly stacked on the polarized film of the second polarized plate to serve as a protective film.

* * * * *